Patented Sept. 23, 1941

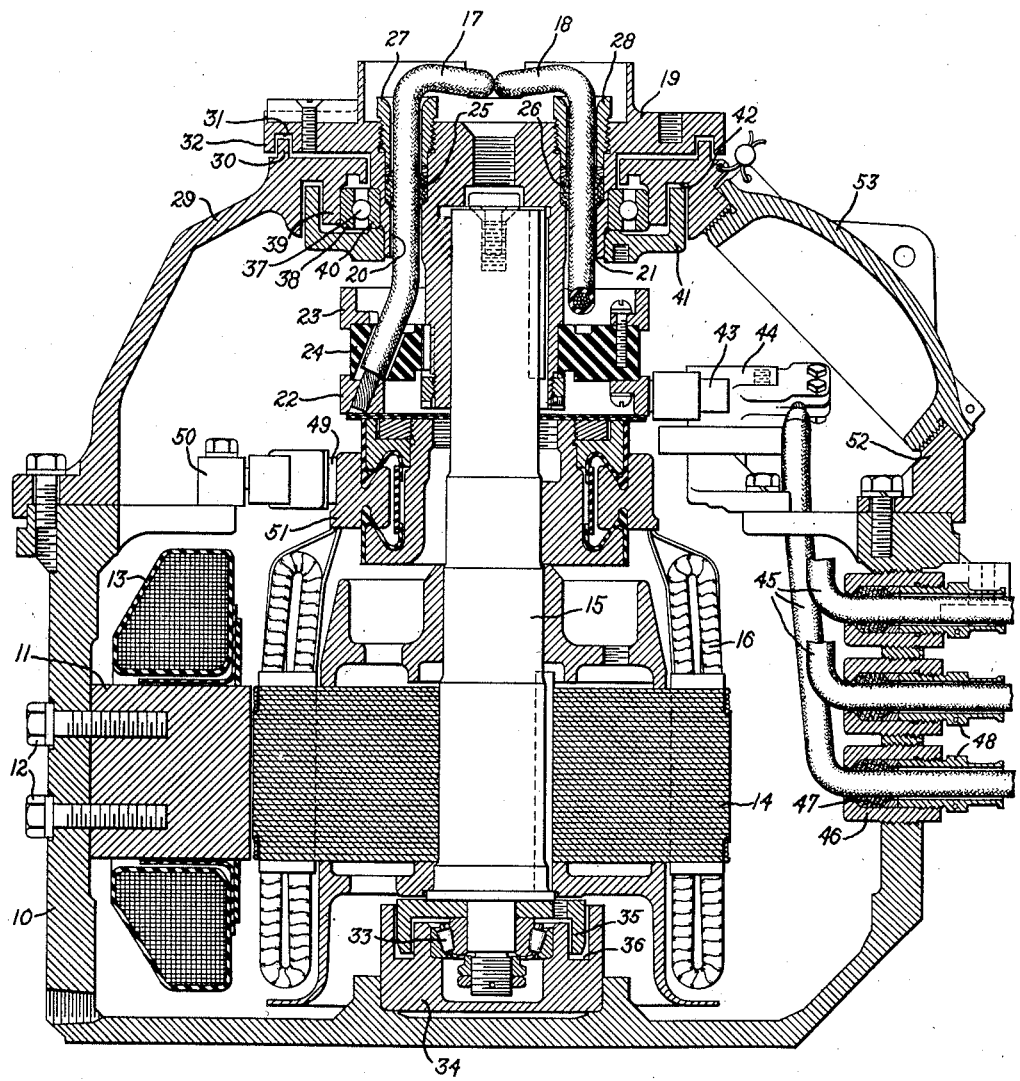

2,256,870

UNITED STATES PATENT OFFICE 2,256,870

DYNAMOELECTRIC MACHINE

Herman W. Schaffer, Erie, Pa., assignor to General Electric Company, a corporation of New York Application April 25, 1941, Serial No. 390,364

7 Claims. (Cl. 172—36)

My invention relates to dynamo-electric machines and more particularly to a vertical shaft sealed reel motor construction.

An object of my invention is to provide an improved dynamo-electric machine having a vertically extending shaft and being adapted to support and drive a cable reel.

Further objects and advantages of my invention will become apparent and my invention will be better understood from the following description referring to the accompanying drawing, and the features of novelty which characterize my invention will be pointed out with particularity in the claims annexed to and forming part of this specification.

The figure of the drawing is a sectional elevational view of a dynamo-electric machine embodying my invention.

In certain mines, an explosive mixture of gases is sometimes found which prevents the use of electrical equipment which might produce sparks and ignite the gases. In such mines, the traction motors of mine locomotives are supplied with power from cables which extend from the last safe trolley line contact point to the locomotive, and these cables are unwound and wound about a reel carried by the locomotive as the locomotive moves in and out of the mine respectively. In order to maintain substantially constant tension on the reel to keep the unused cable wound about the reel, a motor is provided for driving the reel which also acts as a protective housing for the current collecting devices.

Referring to the drawing, I have shown a dynamo-electric machine having a stationary frame member 10 in which salient pole pieces 11 are secured by bolts 12. A field exciting winding 13 is arranged on each pole piece 11 and is adapted to provide field excitation to the motor. This motor is particularly adapted to drive a conductor cable reel such as is used in connection with mine locomotives wherein it is desirable to minimize the possibility of igniting explosive gases surrounding the motor by electrical discharges inside the motor. In order to provide such a construction, it is necessary that the moving electric contacts of the electrical apparatus should be substantially enclosed. The motor is provided with a rotatable member having a core 14 of magnetic material mounted upon a vertically extending shaft 15 and is provided with an armature winding 16 arranged in slots in the core 14 and adapted to react electrodynamically with the pole pieces 11.

Electrical power is supplied to traction motors of a locomotive on which the reel motor is mounted and to the reel motor from cables 17 and 18 adapted to be arranged about a conductor cable reel which is supported on and driven by a cable reel support 19 mounted on the upper end of the shaft 15. Conductor cables 17 and 18 extend from the cable reel through openings 20 and 21 formed in the cable reel support 19 and are electrically connected to slip rings 22 and 23, respectively, which are mounted on an insulating support 24 on the cable reel support 19 adjacent the upper end of the shaft 15. In order to insure against the entrance of explosive gases and foreign substances into the motor through the openings 20 and 21 about the cables, sealing packings of asbestos rope 25 and 26 are arranged about the conductors 17 and 18 and are retained in position between shoulders formed on the reel support 19 and packing gland nuts 27 and 28, respectively, which threadedly engage openings formed in the cable reel support 19. To insure further against the entrance of explosive gases and other foreign substances into the motor, a labyrinth seal is provided between the cable reel support 19 and a frame head or upper end shield member 29 of the motor. This labyrinth seal includes an annular flange 30 formed on the end shield 29 and arranged within a complementary annular groove 31 in the cable reel support 19 and an annular flange 32 on the reel support which extends about the flange 30.

In order to support the rotatable member of the motor and the cable reel, a thrust roller bearing 33 is arranged about the lower end of the shaft 15 and is mounted in a bearing housing 34 supported on the lower end of the stationary member frame 10. A labyrinth seal is formed by an annular flange member 35 mounted on the lower end of the shaft 15 and arranged within a complementary annular groove 36 formed in the bearing housing 34 to minimize the passage of grease from the bearing 33 into the motor housing. The different temperatures and relative humidity in which such a motor operates may cause water to condensate inside of the motor, and this condensate will accumulate in the lower part of the frame 10. In order to prevent the entrance of such water condensate into the lower bearing 33, the bearing housing 34 is made cup-shaped and extends upwardly about the flange 35. The upper end of the motor is supported by ball bearings 37 having an outer stationary race 38 mounted on a flange 39 formed on the end shield 29 and an inner rotatable race 40 mounted on the cable reel support 19. It is particularly desirable to prevent the passage of foreign substances into the ball bearings 37 and to prevent the passage of foreign substances and grease into the motor housing and onto the rotatable electric contacts and other rotatable parts of the rotatable member of the motor, as such foreign substances and grease would greatly increase the possibility of electrical discharges by lessening the dielectric properties of the insulating material of the motor and by increasing the resistance and producing poor contact between the various rotatable electrical contacting surfaces. In order to minimize the passage of grease from the upper bearing 37 to the slip rings and the rotatable member of the motor, another labyrinth seal is arranged which includes an annular sealing ring member 41 press fitted on the reel support 19 which extends into a complementary groove 42 formed in the end shield 29. This seal also performs the added beneficial function of preventing the escape of burning gases from the motor to the surrounding atmosphere and also cools burned gases as they pass through the seal so that they do not burn on the outside of the motor.

Contact brushes 43 are supported in stationary brushholders 44 and are arranged to provide electrical contact with the slip rings 22 and 23 and are connected by cables 45 to the traction motors of the locomotive. Assembly and repairs of this reel motor are facilitated by removably mounting the brushholders 44 on the motor frame 10 and by arranging the openings through which the cables 45 pass in the side of the frame 10, so that it is not necessary to remove them when removing the end frame 29 or the armature 14. In order further to insure against mine explosions, the cables 45 pass through seals in the motor housing which include cup-shaped seal casings or stuffing boxes 46 secured by threaded engagement in openings in the sides of the motor frame 10. These seals include stuffing box sealing elements 47 of asbestos rope arranged about the cables 45 which are pressed into intimate contact with the cables by stuffing box packing gland nuts 48 which threadedly engage the outer ends of the casings 46, thereby providing substantially gas-proof seals about the cables 45. One of these cables 45 is adapted to provide an electrical connection between the motor controller and the motor field windings 13 and the armature winding 16. The other two cables are adapted to energize the traction motor of the locomotive. Power is supplied to the motor armature winding 16 through contact brushes 49 mounted in stationary brushholders 50, and these brushes 49 are arranged in contact with a commutator 51 mounted on the upper end of the shaft 15 adjacent the slip rings 22 and 23. With this construction, all of the relatively movable electrical contacts are arranged adjacent each other near the upper end of the motor, and four spaced-apart inspection openings 52 are formed in the end shield 29 to facilitate inspection, adjustment, and repair of the various movable electrical contact elements. These inspection openings 52 normally are closed by removable closure covers 53 which threadedly engage the sides of the inspection openings 52. This construction provides for ready access to the various moving electrical contacts and substantially minimizes the possibility of explosions due to the ignition of explosive gases from electrical discharges from these relatively movable electrical contacts.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A vertical shaft motor having a stationary member and a rotatable member provided with a vertically extending shaft, slip rings mounted adjacent the upper end of said shaft, means for supporting a conductor reel on the upper end of said shaft and having a driving connection therewith, conductor openings in said reel supporting means, conductors extending through said openings and being electrically connected to said slip rings, and means for sealing said openings about said conductors substantially to prevent the passage of explosive gases therethrough, said reel supporting means including a labyrinth seal formed with said stationary member for substantially preventing the passage of explosive gases therethrough.

2. A vertical shaft motor having a stationary member and a rotatable member provided with a vertically extending shaft, slip rings mounted adjacent the upper end of said shaft, means for supporting a conductor reel on the upper end of said shaft and having a driving connection therewith, conductor openings in said reel supporting means, conductors extending through said openings and being electrically connected to said slip rings, means for sealing said openings about said conductors substantially to prevent the passage of explosive gases therethrough, said reel supporting means including a labyrinth seal formed with said stationary member for substantially preventing the passage of explosive gases therethrough, and means including contact brushes removably mounted on said stationary member for collecting current from said slip rings.

3. A vertical shaft motor having a stationary member and a rotatable member provided with a vertically extending shaft, slip rings mounted adjacent the upper end of said shaft, means for supporting a conductor reel on the upper end of said shaft and having a driving connection therewith, conductor openings in said reel supporting means, conductors extending through said openings and being electrically connected to said slip rings, means for sealing said openings about said conductors substantially to prevent the passage of explosive gases therethrough, said reel supporting means including a labyrinth seal formed with said stationary member for substantially preventing the passage of explosive gases therethrough, means including contact brushes removably mounted on said stationary member for collecting current from said slip rings, conductors connected to said brushes extending through openings in the side of said stationary member, and means for sealing said side openings about said conductors.

4. A vertical shaft motor having a stationary member and a rotatable member provided with a vertically extending shaft, slip rings mounted adjacent the upper end of said shaft, means for supporting a conductor reel on the upper end of said shaft and having a driving connection therewith, conductor openings in said reel supporting means, conductors extending through said openings and being electrically connected to said slip rings, means for sealing said openings about said conductors substantially to prevent the passage of explosive gases therethrough, an upper bearing for rotatably supporting the upper end of said shaft on said stationary member, said reel supporting means including a labyrinth seal formed with said stationary member for substantially preventing the passage of explosive gases to and from said stationary member and foreign substances into said upper bearing, and means including a labyrinth seal for substantially preventing the passage of lubricant from said upper bearing onto said slip rings and said rotatable member.

5. A vertical shaft motor having a stationary member and a rotatable member provided with a vertically extending shaft, a commutator for said rotatable member adjacent the upper end thereof, slip rings mounted adjacent said upper end of said shaft, means for supporting a conductor reel on the upper end of said shaft, and having a driving connection therewith, conductor openings in said reel supporting means, conductors extending through said openings and being electrically connected to said slip rings, means for sealing said openings about said conductors substantially to prevent the passage of explosive gases therethrough, said reel supporting means including a labyrinth seal formed with said stationary member for substantially preventing the passage of explosive gases to and from said stationary member, an inspection opening adjacent the upper end of said stationary member for providing access to said commutator and said slip rings, and a removable closure for said inspection opening.

6. A vertical shaft motor having a stationary member and a rotatable member provided with a vertically extending shaft, a commutator for said rotatable member adjacent the upper end thereof, slip rings mounted adjacent said upper end of said shaft, means for supporting a cable reel on the upper end of said shaft and having a driving connection therewith, cable openings in said reel supporting means, cables extending through said openings and being electrically connected to said slip rings, means for sealing said openings about said cables substantially to prevent the passage of explosive gases therethrough, an upper bearing for rotatably supporting the upper end of said shaft on said stationary member, means including a labyrinth seal for substantially preventing the passage of explosive gases therethrough and of lubricant from said upper bearing onto said slip rings and said rotatable member, an inspection opening adjacent the upper end of said stationary member, and a removable closure for said inspection opening.

7. A vertical shaft motor having a stationary member and a rotatable member provided with a vertically extending shaft, a thrust bearing adjacent the lower end of said shaft adapted to support said rotatable member, a commutator for said rotatable member adjacent the upper end thereof, slip rings mounted adjacent said upper end of said shaft, means for supporting a cable reel on the upper end of said shaft and having a driving connection therewith, cable openings in said reel supporting means, cables extending through said openings and being electrically connected to said slip rings, means for sealing said openings about said cables substantially to prevent the passage of explosive gases therethrough, an upper bearing for rotatably supporting the upper end of said shaft on said stationary member, said reel supporting means including a labyrinth seal formed with said stationary member for substantially preventing the passage of explosive gases to and from said stationary member and foreign substances into said upper bearing, means including a labyrinth seal for substantially preventing the passage of lubricant from said upper bearing onto said slip rings and said rotatable member, inspection openings adjacent the upper end of said stationary member, and removable closures for said inspection openings.

HERMAN W. SCHAFFER.